United States Patent Office 3,171,346
Patented Mar. 2, 1965

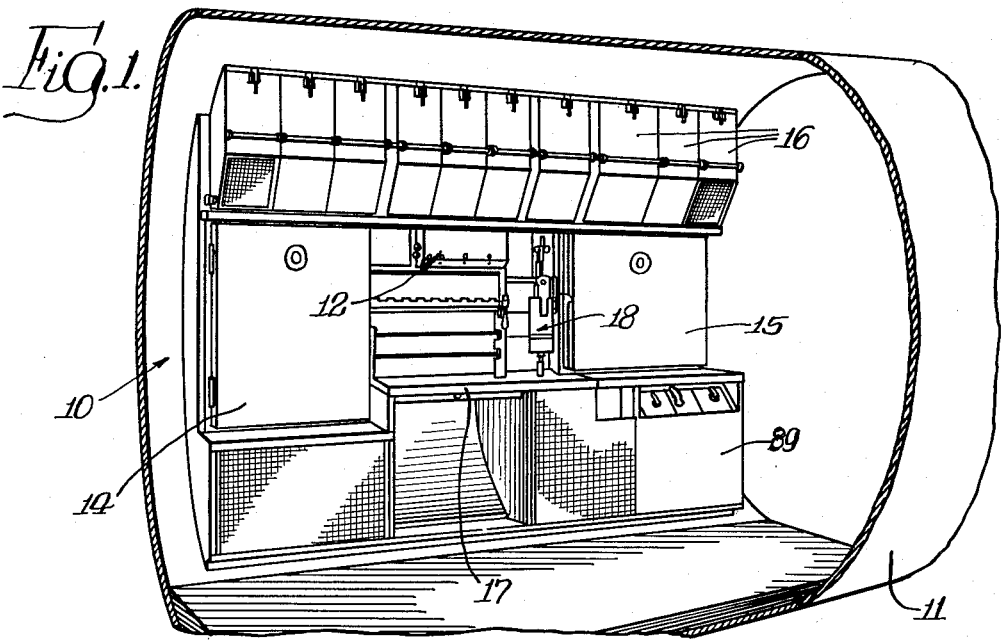
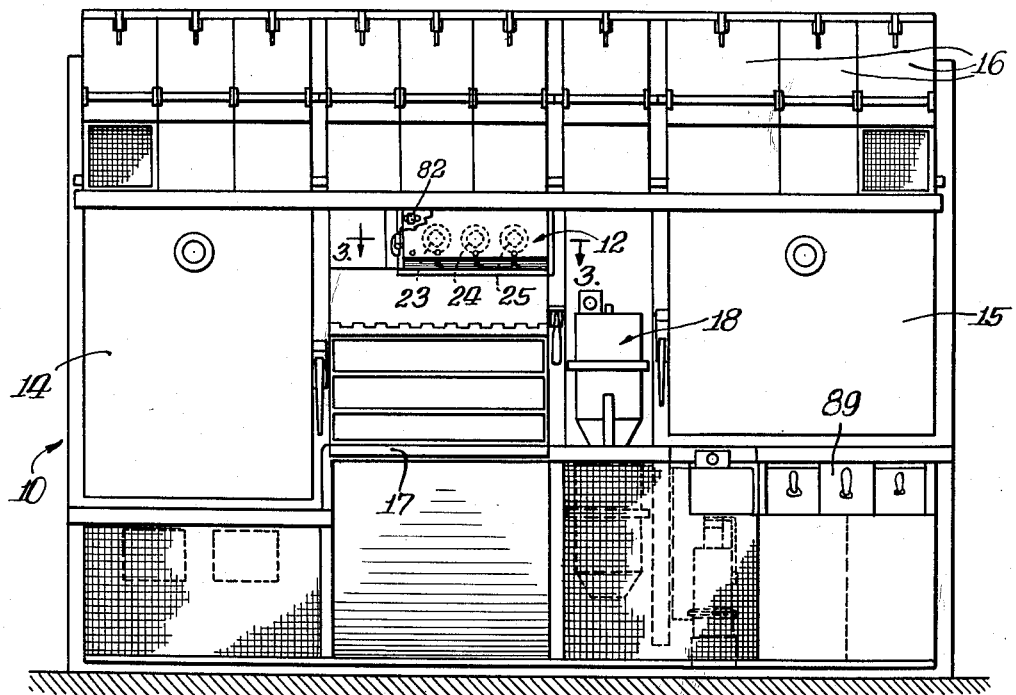

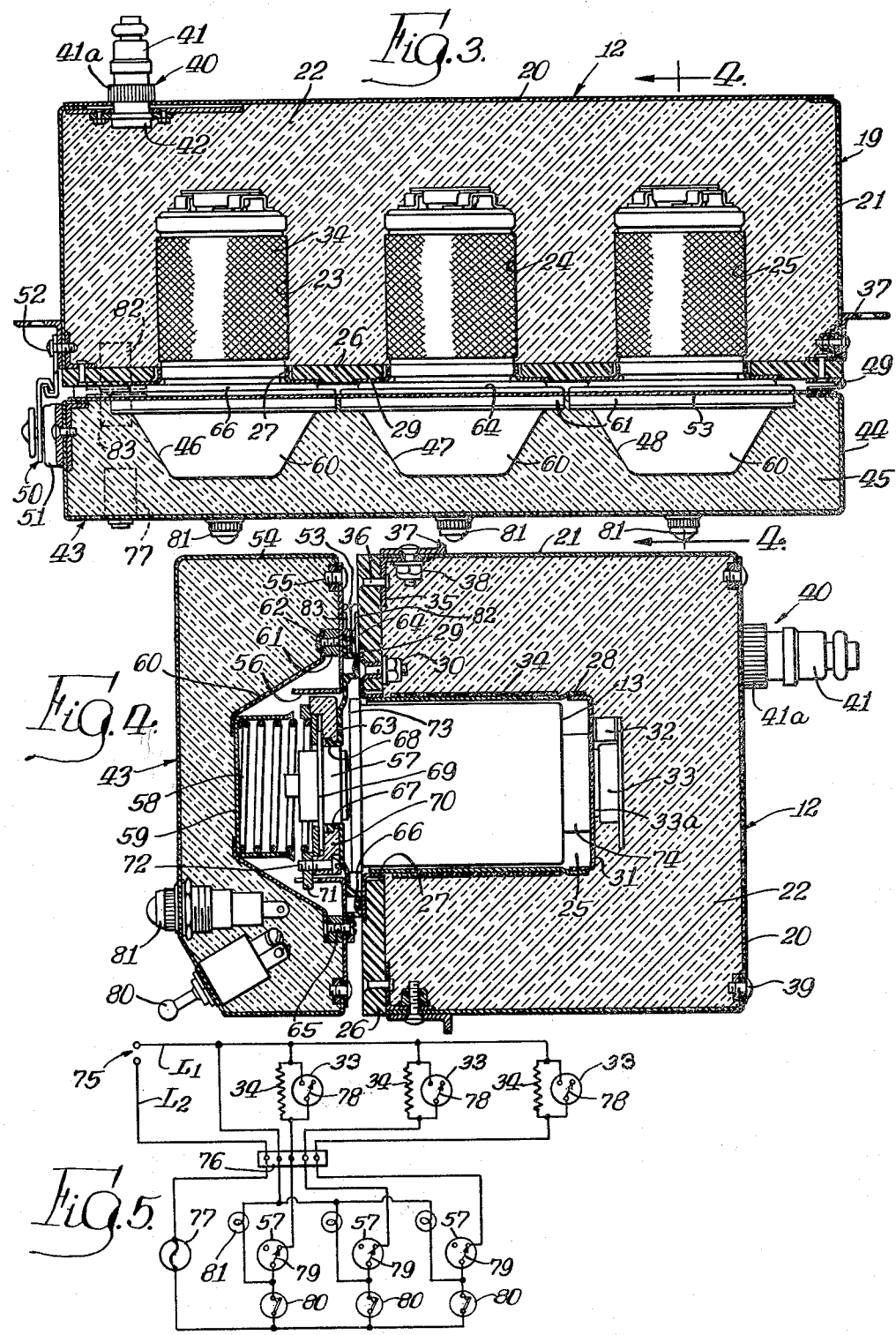

3,171,346
PACKAGED PRODUCT OVEN FOR SPACE
VEHICLES
James W. Lannert and George Boswinkle, St. Joseph,
Mich., assignors to Whirlpool Corporation, a corporation of Delaware
Filed Dec. 15, 1961, Ser. No. 159,525
6 Claims. (Cl. 99—331)

This invention relates to heating means and in particular to ovens for use in heating foodstuffs and the like.

The present invention is concerned with the problem of heating packaged products quickly, safely and efficiently. This problem is aggravated where the heating of the packaged products is effected under any one of a plurality of different conditions including reduced space capsule air pressures and zero gravity as encountered in space flight. The present invention comprehends an improved oven construction for use in heating such packaged products in such widely varying environments.

Thus, a principal feature of the present invention is the provision of a new and improved oven structure.

Another feature of the present invention is the provision of such an oven structure arranged for improved heating of packaged products in oven installation environments having any one of a plurality of different conditions including zero gravity and air pressures below standard atmospheric pressure.

A further feature of the invention is the provision of such an oven comprising a cavity type warming oven for use in the warming of packaged products such as foods sealed in containers having a size and shape conforming generally to that of the oven cavities.

A yet further feature of the invention is the provision of such an oven adapted for use in the kitchen of a space vehicle.

A still further feature of the invention is the provision of such an oven having new and improved means for the control of the heating operation.

A yet further feature of the invention is the provision of such an oven having improved means for sensing the temperature of the packaged product and providing improved control of the heating thereof to a preselected temperature.

Still another feature of the invention is the provision of such an oven including wall means defining an external oven shell having a closed rear portion and an open front portion with a front wall member of thermal insulating material mounted in the open front portion, oven cavities mounted in the thermal insulating front wall member having front openings and closed rear portions, a door movably connected to the oven shell and thermal insulating front wall member for selectively closing the cavity front openings, the door having yieldable means confronting the oven cavities when the door is closing the openings to urge a packaged product in the cavities against the wall means at the closed rear portions, means for delivering heat to within the cavities, and means associated with the yieldable means for engagement with the packaged product in the cavities to sense accurately the temperature of the packaged product, the sensing means being further associated with the heating means for controlling the operation thereof to bring the temperature of the packaged product to a preselected value and to maintain it at that value.

Other features and advantages of the invention will be apparent from the following description taken in connection with the accompanying drawings wherein:

FIG. 1 is a perspective view of a kitchen installed in a portion of a space vehicle and provided with an oven embodying the invention;

FIG. 2 is a front elevation of the kitchen;

FIG. 3 is an enlarged horizontal section of the oven;

FIG. 4 is a vertical section thereof taken substantially along the line 4—4 of FIG. 3; and FIG. 5 is a schematic wiring diagram illustrating the electrical circuitry of the oven.

In the exemplary embodiment of the invention as disclosed in the drawing, a space kitchen generally designated 10 is shown as installed in a tubular shell 11 which may comprise a portion of a space vehicle arranged to carry human passengers. As such a space vehicle encounters different gravitational conditions, including zero gravity conditions, the kitchen 10 is arranged for effective operation under any one of such different gravitational conditions. The kitchen 10 includes an oven generally designated 12 for heating packaged products such as precooked foods contained in specially designed suitable storage containers, herein illustrated as cans 13 as shown in FIGURE 4. Food storage facilities are provided in kitchen 10 in the form of freezer 14, refrigerator 15 and bunkers 16. The kitchen is arranged, for example, to store sufficient food to maintain three men for a period of two weeks in space. The oven 12 is arranged to warm concurrently sufficient food stuffs to comprise a meal for one man. This person utilizes the oven 12 while sitting at a counter 17 spaced subjacent the oven. As best seen in FIG. 2, the person sitting at counter 17 has oven 12 disposed immediately in front of him with the freezer 14 and refrigerator 15 conveniently located at his left and right hands, respectively. In addition, a water supply means 18 is immediately disposed to the left of refrigerator 15 and a waste bunker 89 is provided below the refrigerator 15.

Referring now to FIGS. 3-5, oven 12 may be seen to comprise a cabinet or outer shell 19 having a rear wall 20 and side walls 21 filled with a heat insulating material 22. The open front of the cabinet is closed by a wall member 26 constructed of thermal insulating material having openings 27 therethrough in which three identical oven cavities 23, 24 and 25 having closed rear ends 31 and open front ends are mounted. A liner 28 is provided for each cavity to define the outer wall thereof. The liner is provided with an outturned forward portion 29 facially engaging the front surface of the wall member 26 and secured to the wall member 26 by suitable means such as nut and bolt means 30. Each cavity includes a rear wall or end member 31. A bracket member 32 is affixed, as by spot welding, to wall member 31. A safety thermostat 33 is affixed to bracket member 32 so that the front face 33a of thermostat 33 presses against rear wall member 31 of each cavity. A screen-type electrofilm strip heater 34 is arranged around the liner 28 of each cavity for transmitting heat to the interior of the cavity. In the illustrated embodiment, the heaters 34 are arranged to provide approximately 100 watts of heat energy with an applied voltage of approximately 28 volts.

The front wall member 26 is secured to angle brackets 35 by suitable means such as rivets 36, the angle brackets 35 being secured to the side walls 21 of the cabinet and the frame member 37 which in turn is connected to the kitchen frame structure by suitable means such as nut and bolt means 38. The rear wall 20 of the cabinet or oven outer shell is secured to the side walls 21 by suitable means such as nut and bolt means 39. A power inlet fitting 40 is secured to the rear wall 20 for delivering electrical energy from the space vehicle power system to the oven. As shown in FIG. 3, the fitting 40 may comprise a conventional plug 41, receptacle 42 and retaining member 41a permitting facilitated connection and disconnection thereof as for maintenance purposes.

A single door 43 is provided to extend across the front of the oven for concurrently closing each of the three cavities 23, 24 and 25. The door includes a thin walled housing 44 filled with a body of insulating material 45. The door is pivotally mounted on front wall 26 by hinge means 49 and is removably latched in the closed position by a suitable latch 50 having one portion 51 secured to the door and a fixed portion 52 secured to the cabinet 19.

The front panel 53 of the door housing 44 is secured to the housing portion 54 thereof by suitable means such as screws 55 and is provided with three openings 56 aligned with the cavities 23, 24 and 25. A control thermostat 57 is disposed coaxially in each of the openings 56 and is urged rearwardly toward the confronting cavities 23, 24 and 25 by a coil spring 58 retained by a spring seat 59 carried on a shell member 60 secured to a mounting member 61 on wall member 53 by suitable means such as screws 62. The shell members 60 define door cavities 46, 47 and 48 that respectively confront oven cavities 23, 24 and 25 when the door 43 is in the closed position. A flexible diaphragm 63 is secured to wall member 53 by a diaphragm ring 64. Screws 65 secure the diaphragm ring and the mounting member 61 to the wall 53. The diaphragm 63 is provided with a rearwardly projecting seal portion 66 which engages the turned end 29 of the oven cavity liner 28 to seal the associated cavities 23, 24 and 25 when the door is in the closed position of FIGURES 3 and 4.

The diaphragm 63 is further provided with a forwardly turned mid-portion 67 defining an opening 68 through which the control thermostat 57 extends. The thermostat 57 is provided with an annular flange 69 which is clamped between an annular mounting ring 70 and an annular plate 71 by means such as screws 72. The plate 71 defines a seat for the rear end of the coil spring 58 whereby the entire assembly of the plate 71, ring 70, thermostat 57, and mid-portion of the diaphragm 63 is urged rearwardly toward the associated cavities 23, 24 or 25.

As shown in FIG. 4, the can 13 is preferably provided with a front wall 73 which is engaged by the thermostat 57 whereby direct positive thermal transfer between the can 13 and thermostat is effected. The opposite end of the can 13 is provided with a cap 74 which is urged by spring 58 against the rear wall 31 of the liner 28. The safety thermostat 33 is arranged to engage the rear wall 31 and, thus, a positive thermal transfer is effected between the cap 74 and the safety thermostat 33. Thus, coil spring 58 serves the functions of maintaining the can 13 against longitudinal movement in the cavity, in positive heat transfer relationship with each of two different thermostats.

Referring now to FIG. 5, electrical energy is delivered to the fitting 40 of the oven from a suitable power source, herein a 28-volt direct current supply. One main lead L1 is connected to one end of each of the heaters 34, and the other main lead L2 is connected to a terminal block 76 and then to a circuit breaker 77. The safety thermostats 33 are provided with a normally open switch 78 connected in parallel with the heater 34, and this parallel connection is, in turn, connected through the terminal block 76 to the associated control thermostat 57 which includes a switch 79 which cycles to opened and closed positions in response to the temperature sensed by the control thermostat. The switches 79 are in turn connected in series through toggle type individual combination on-off and circuit breaker switches 80 to the main circuit breaker 77. Three on-off indicating lights 81 are connected from lead L1 to switches 80 to indicate the setting of the respective switches 80. Thus, whenever a switch 80 is closed, the corresponding signal light 81 is illuminated, indicating that energy is being delivered to the associated control thermostat 57 which in turn controls the energization of heaters 34 to cycle heaters 34 on and off to provide a gradual temperature rise of the food contents in containers 13. The indicating light remains on notwithstanding a change in the on-off condition of the thermostat controlled switch 79. However, should for any reason the temperature within the cavity controlled by the thermostat 57 reach a preselected abnormally high temperature due to a failure of thermostat 57, the safety thermostat 33 closes the switch 78 thereof to short out the heater 34 and thereby cause the circuit breaker switch 80 in series therewith to the open position. This immediately extinguishes indicating light 81 associated therewith to indicate to the user the malfunctioning of the device. The thermostat 33 is arranged so that it will automatically reset upon a lowering of the temperature in the cavity to below the preselected abnormally high temperature. However, the switch 80 must be manually reset to the on position to reinitiate energization of the heater 34 and indicator light 81. Further, the main circuit breaker 77 serves as an additional safety device in the event of failure of one of the circuit breakers 80 to control the operation of the entire set of three ovens. As shown, the indicating lights 81 and the circuit breaker switches 80 are carried by the door 43. The terminal block 76 comprises a cooperating socket 82 and plug 83 (FIGURE 3) carried by the plate 26 and door 43, respectively. The plug and socket are arranged so that when the door 43 is in the closed position of FIG. 3 with the latch 50 in the door locking position, electrical energy is passed from fitting 40 therethrough to the door mounted switches 80, thermostats 57, circuit breaker 77 and indicating lights 81.

In the illustrated embodiment, the cavities 23, 24 and 25 are generally diamond-shaped in transverse cross section and the cans 13 are correspondingly shaped. Obviously, other geometrical configurations may be employed. Further, while three cavities are shown in illustrating the invention, it is obvious that any number of such cavities may be employed within the scope of the invention.

By virtue of the improved thermal transfer association of the thermostats with the can 13, the heating of the product within the can is controlled by the temperature of the product itself. Thus, in normal operation, after the astronaut loads the oven cavities with the cans 13, closes the door, and operates the necessary switches 80 to the on position, the control of the heating elements 34 is effected by the thermostats 57. The thermostats 57 are preferably set at a temperature to assure that the temperature of the food in cans 13 remains below the boiling point of water in the atmospheric condition in which the oven is to be used. In environments such as intended in the space vehicle 10, it is contemplated that the pressure will be approximately one-half atmosphere and, thus, the boiling point of water would be approximately 179° F. Thus, the thermostat 57 is set to prevent the temperature of the food within can 13 from reaching 179° F. Should the thermostat 57 for any reason fail and the temperature within the can 13 rise dangerously close to 179° F., the safety thermostat 33 automatically terminates further operation of the heating means.

As the cavities 23, 24 and 25 are effectively positively insulated, substantially no heat loss occurs, and a highly efficient transfer of heat energy to the oven cavities is obtained. Thus, it has been found that in normal operation the thermostat 57 cycles the heater 34 on and off during the specified heating period as stated on the can containing the food to be heated. As substantially all heat energy from the heater 34 is transferred to the product in the can 13, a highly efficient heating results, minimizing energy requirements in the system. While such efficiency is not such a necessary requirement where the oven is utilized as in a home kitchen with a ready power supply, the fact that substantially no heat is transferred to the surrounding atmosphere is a highly desirable feature as where the kitchen is air-conditioned. Further, because of the compact self-sustaining configuration of the oven and packaged product, a substantial number of additional advantages are obtained. Thus, the weight and size of the oven is effectively minimized. Further, the oven provides effectively maximum reliability, serviceability and maintenance of sanitary conditions. The oven is extremely simple in operation. The oven is capable of withstanding substantial acceleration forces which is a highly desirable feature where the oven is intended for use in space vehicles. Further, the oven operates substantially similarly under any one of different gravitational conditions and by suitable selection of the thermostats 57 provides improved functioning under any one of different atmospheric pressure conditions.

While we have shown and described one embodiment of our invention, it is to be understood that it is capable of many modifications. Changes, therefore, in the construction and arrangement may be made without departing from the spirit and scope of the invention as defined in the appended claims.

The embodiment of the invention in which an exclusive property or privilege is claimed is defined as follows:

1. An oven for use in heating packaged products in environments having any one of a plurality of different gravitational and air pressure conditions including a zero-gravity condition, comprising: wall means defining a cavity having a front opening and a closed rear portion; a door movably connected to the wall means for selectively closing said opening, said door having yieldable means confronting said cavity when said door is closing said opening for urging a packaged product in said cavity against the wall means at said closed rear portion; electrically operable means for delivering heat to within said cavity; cooperating means on said wall means and said door for precluding energization of said heat means whenever the door is not closing said opening; manually operable control means carried by said door and connected electrically in series with said cooperating means for selectively energizing and deenergizing the heat means; and thermostat means urged by said yieldable means for engaging the packaged product in the cavity when said door is closing said opening to sense accurately the temperature of the packaged product, said thermostat means being further associated with said heating means for controlling the operation thereof to bring the temperature of the packaged product to a preselected value and to maintain it at said value.

2. An oven for use in heating packaged products in environments having any one of a plurality of different gravitational and air pressure conditions including a zero-gravity condition, comprising: wall means defining a cavity having a front opening and a closed rear portion; a door movably connected to the wall means for selectively closing said opening; a thermostat carried by the door; spring means between said door and said thermostat for forcibly urging the thermostat into engagement with a packaged product in the cavity to sense accurately the temperature of the packaged product and forcibly urging the packaged product against the wall means at said oven cavity closed rear portion; and means for delivering heat to within said cavity, said thermostat being associated with said heat means for controlling the temperature of the packaged product.

3. An oven for use in heating packaged products in environments having any one of a plurality of different gravitational and air pressure conditions including a zero-gravity condition, comprising: wall means defining a cavity having a front opening and a closed rear portion; a door movably connected to the wall means for selectively closing said opening; a first thermostat carried by the door; a second thermostat against said wall means at said rear portion of the cavity; spring means between said door and said first thermostat for forcibly urging said first thermostat into engagement with a packaged product in the cavity to sense accurately the temperature of the packaged product and thereby urge the packaged product against the closed rear portion of said cavity and into thermal transfer association with said second thermostat at said closed rear portion; electrically operable means for delivering heat to within said cavity; means for abnormal deenergization of said heat means, said first thermostat being associated with said heat means for normally controlling the temperature of the packaged product and said second thermostat controlling said abnormal deenergization means to deenergize said heat means when the temperature of said packaged product reaches a preselected abnormally high temperature.

4. The oven of claim 2 further including a safety thermostat mounted on said rear wall of said oven cavity in heat transfer contact therewith to control said heating means for limiting the temperature of the packaged product as a result of a malfunction of said spring urged thermostat.

5. An oven for use in heating packaged products in environments having any one of a plurality of different gravitational and air pressure conditions including a zero-gravity condition, comprising: wall means defining a cavity having a front opening and a closed rear portion; a door movably connected to the wall means for selectively closing said opening; a first thermostat carried by the door; a second thermostat against said wall means at said rear portion of the cavity; spring means between said door and said first thermostat for forcibly urging said first thermostat into engagement with a packaged product in the cavity to sense accurately the temperature of the packaged product, said spring means being arranged further for forcibly urging the packaged product against the closed rear portion of said cavtiy thereby to urge the packaged product into thermal transfer association with said second thermostat at said closed rear portion; electrically operable means for delivering heat to within said cavity; means for abnormal deenergization of said heat means, said first thermostat being associated with said heat means for normally controlling the temperature of the packaged product and said second thermostat controlling said abnormal deenergization means to deenergize said heat means when the temperature of said packaged product reaches a preselected abnormally high temperature, said abnormal deenergization means comprising a circuit breaker and said second thermostat including contacts connected in parallel with said heat means for shorting out said heat means and thereby tripping the circuit breaker to deenergize said heat means when the temperature reaches said abnormally high temperature.

6. The oven of claim 5 wherein a signal light is mounted on said door and connected in parallel with said first thermostat.

References Cited in the file of this patent

UNITED STATES PATENTS

| 1,385,631 | Luhrmann | July 26, 1921 |
| 2,075,474 | Scutt | Mar. 30, 1937 |
| 2,287,956 | Aff | June 30, 1942 |
| 2,387,460 | Myers | Oct. 23, 1945 |
| 2,427,945 | Clark et al. | Sept. 23, 1947 |
| 2,576,874 | Acton | Nov. 27, 1951 |
| 2,791,706 | Font | May 7, 1957 |

FOREIGN PATENTS

| 410,543 | Great Britain | May 24, 1934 |
| 830,150 | Germany | July 8, 1949 |